United States Patent Office 3,449,719
Patented June 10, 1969

3,449,719
CAM CONTROLLED PULSE RESPONSIVE
RECEIVER
Peter W. Camarata, Huntington, and John W. Wicks,
Oceanside, N.Y., assignors to the United States of
America as represented by the Secretary of the Navy
Filed Feb. 23, 1965, Ser. No. 434,715
Int. Cl. H04q 1/30
U.S. Cl. 340—164
6 Claims

ABSTRACT OF THE DISCLOSURE

A receiver responsive to coded signal pulses is disclosed. Two cams having coded surfaces control stepping relays in response to proper code input. Signal responsive indicator means is provided.

The invention described herein may be manufactured and used by or for the Government of the United States of America for governmental purposes without the payment of any royalties thereon or therefor.

This invention relates generally to signal differentiating devices and more particularly to a device for distinguishing between a fire signal simulating detonation of a warhead and a "safe" signal simulating the "safing" or nonfiring of a warhead.

In devices of this character heretofor devised, methods of distinguishing between pulse coded signals invariably encompassed sophisticated and complex decoding techniques. Such methods employed frequency modulated shifting to distinguish between variable length pulses, or electronic differential detection equipment. Obviously such methods are costly and involve sensitive circuital arrangements and adjustments. Further difficulty arises in such systems when a spurious pulse appears in the system from some unknown source, thereby giving rise to an erroneous indication.

The foregoing difficulties are obviated by the signal differentiator of the present invention wherein a first series of pulses arranged in a predetermined time sequence will trigger a "fire" signal while a second series of pulses in a rearranged predetermined time sequence will trigger a "safe" signal. The arrangement of the present invention further prevents a spurious signal from upsetting the prearranged triggering response and thereby obviates the problem of erroneous readings.

It is an object of this invention to provide a rugged system capable of providing training for personnel in the operation of missile firing systems.

It is a further object of the present invention to provide a new and improved signal differentiating device for simply and economically determining the character of a series of pulses presented in prearranged sequence.

It is another object of this invention to provide a device for rejecting spurious pulses to prevent erroneous indications.

It is still a further object of this invention to provide a new and improved signal detector for providing outputs indicative of one of only two possible time coded signal inputs.

It is another object of the present invention to provide a device for receiving a plurality of pulse signals arranged in a predetermined time coded relationship including therein a starting pulse which will initiate the detection process of the additional pulses.

Figure 1:
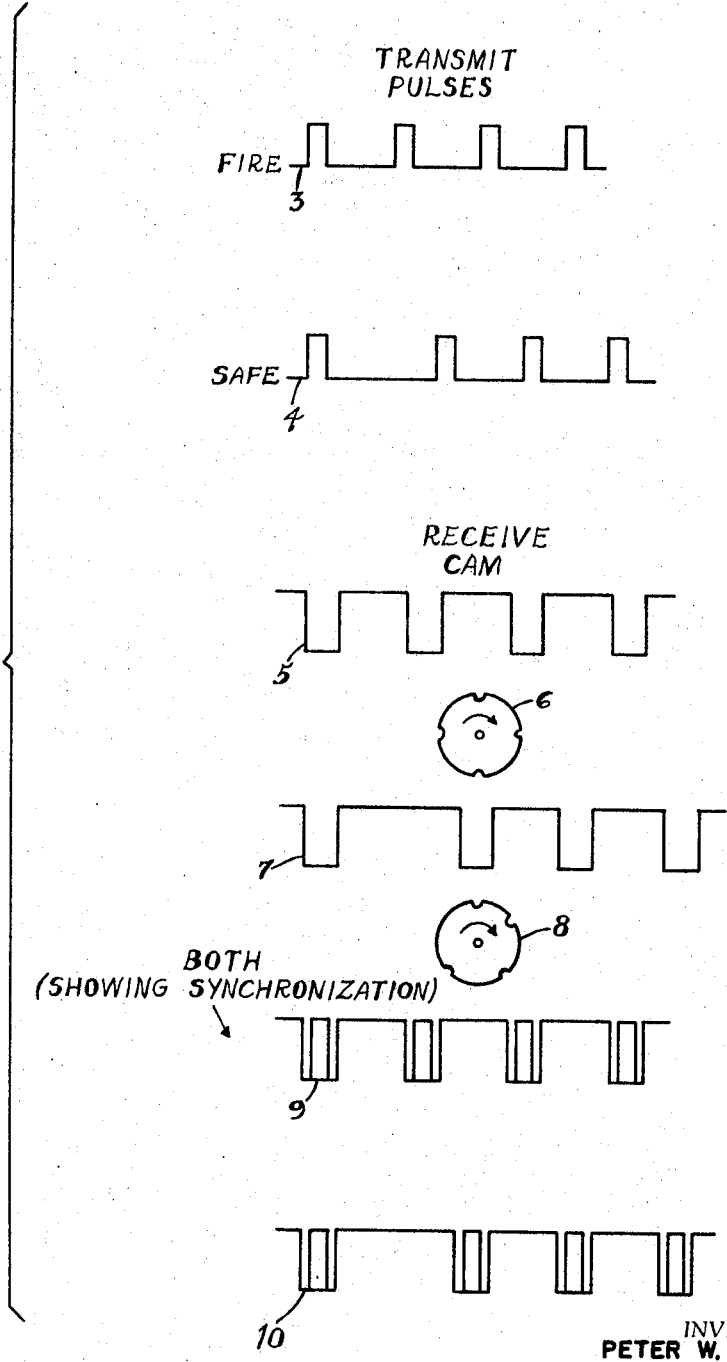
Figure 2:
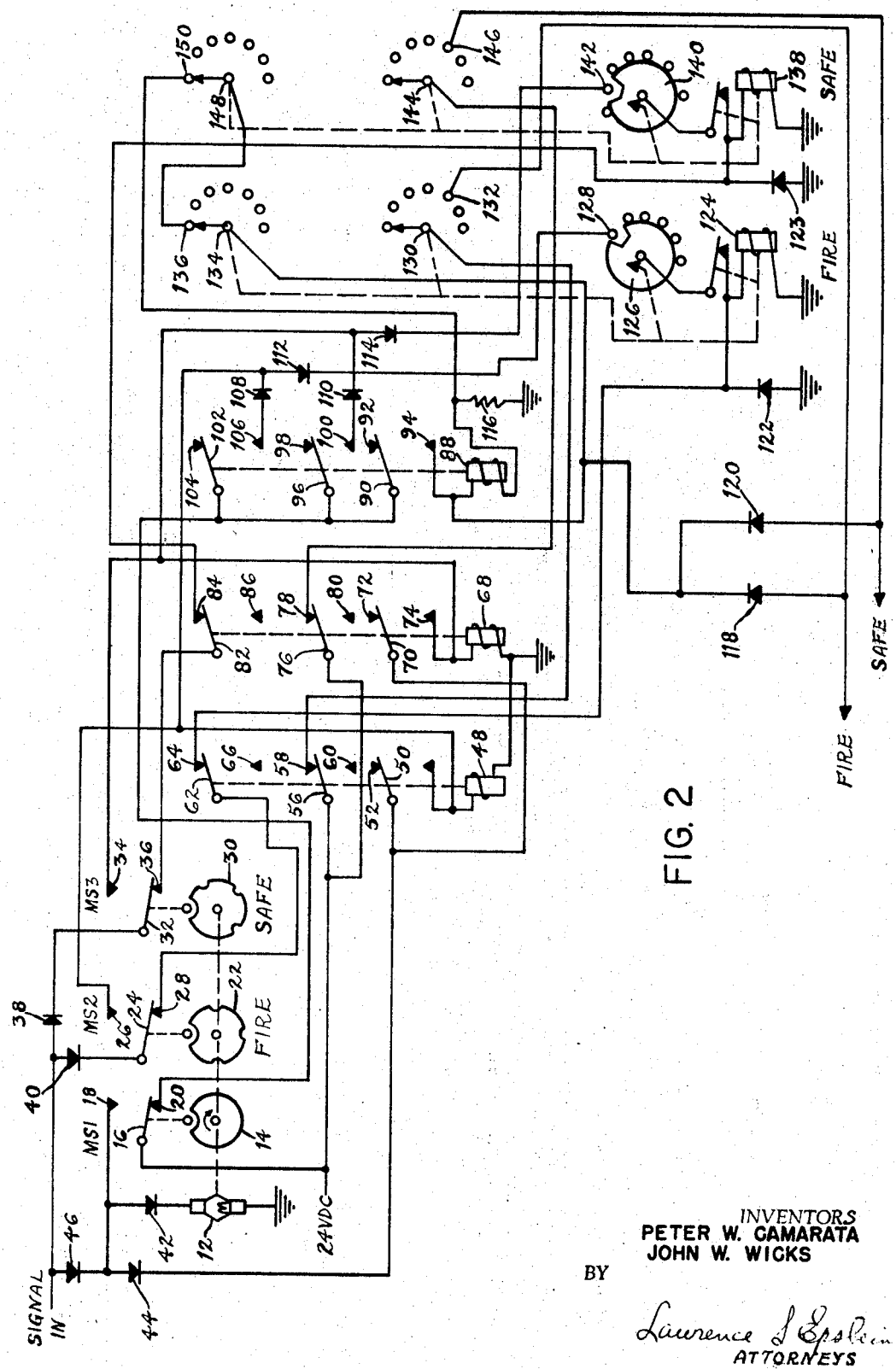

Other objects and many of the attendant advantages of this invention will be readily appreciated as the same becomes better understood by reference to the following detailed description when considered in connection with the accompanying drawings wherein:

FIG. 1 is a graphic illustration used to explain the principle of operation of the invention; and FIG. 2 is a structural embodiment illustrating one mechanized form of the invention.

To determine whether a simulated warhead will be detonated or not, a transmitting device is provided for the generation of a pair of time coded pulses signals. The first series of said pair will represent a "fire" signal simulating firing, while the second series will represent a "safe" signal simulating nonfiring. A receiving device is provided for distinguishing between the two signals and routing the proper signal to its proper location. To this end, the receiver employs a synchronous timing device which begins to operate upon the receipt of the first pulse of either the "fire" signal or the "safe" signal. A pair of notched cam microswitches driven by a synchronous motor route the remainder of the pulses through a selective relay circuit to a proper location dependent upon the nature of the received signal.

Referring now to FIG. 1, there is shown a timing waveform diagram illustrating the basic operation of the present invention. The transmitter, either radio or wire, generates a train of four pulses spaced 90 degrees apart for a fire signal 3 and a train of four pulses spaced, except for the first pulse, 45 degrees later than the corresponding fire pulses, for a safe signal 4. A receiver unit serves to distinguish between the two trains and route the proper signal to the proper location by employing a synchronous cam-microswitching arrangement with a switching function 5 corresponding to a transmitted fire signal and a switching function 7 corresponding to a safe signal. The cams 6 and 8 are themselves rotated synchronously with the transmitter time function and are cut to correspond to the required switching functions. Upon receipt and proper synchronization, the transmitted pulses coincide with the operation of the switching cams for both the fire signal 9 and the safe signal 10.

FIG. 2 discloses a preferred embodiment employing the above described principles. Particularly there is disclosed a synchronous motor unit 12 driving an on-off cam-microswitch 14 having a switch arm 16 and contacts 18 and 20, a fire cam-microswitch 22 having a switch arm 24 and contacts 26 and 28, and a safe cam-microswitch 30 having switching arm 32 and contacts 34 and 36. A series of diodes 38, 40, 42, 44 and 46 are provided to insure proper signal polarities and guard against erroneous signal routing. The cam switched signals are routed by a series of relays beginning with a first relay 48 having a first switch arm 50 and contacts 52 and 54, a second switch arm 56 having contacts 58 and 60, and a third switch arm 62 having contacts 64 and 66. A second relay 68 is provided with a first switch arm 70 having contacts 72 and 74, a second switch arm 76 having contacts 78 and 80 and a third switch arm 82 having contacts 84 and 86. A third relay 88 is provided with a first switch arm 90 having contacts 92 and 94, a second switch arm 96 having contacts 98 and 100, and a third switch arm 102 having contacts 104 and 106. Diodes 108, 110, 112 and 144 are provided to insure proper signal polarity and to prevent erroneous firings. Resistor 116 serves as a load under certain switching conditions described below. Diodes 118, 120, 122 and 123 serve to route signals in a predetermined direction and to prevent erroneous indications. Signals routed by relays 48 and 68 then appear on either of two rotating wafer stepping relay switches. The first of these carries a fire signal indication and is illustrated by an electromagnetic relay 124, having a clockwise rotating notched wafer 126 with a significant contact 128, an arm wafer 130 having a significant contact 132 and a further arm wafer 134 having a significant contact 136. The second of these relay switches carries a safe signal indication and is illustrated by an electromagnetic relay 138 having a first notched wafer 140 and a significant contact 142, an arm wafer 144 having a significant contact 146 and a further arm wafer 148 having a significant contact 150.

In operation, all the switches are in the positions illustrated. The first pulse of either a fire or safe signal energizes synchronous motor 12, and through the contacts 28 and 36 of switches 22 and 30 and contacts 64 and 84 of relays 48 and 68, causes the wafers of relays 124 and 138 to each advance one step. After the motor 12 starts, switch arm 16 contacts element 18 thereby causing motor 12 to remain energized for the duration of the cycle.

The second pulse of a fire signal must arrive at the receiver when cam-microswitch 22 is in the second detent. The pulse will pass through closed contact 28 and the closed contact 64 to advance relay 124 another step. At the same time, this pulse passes through closed contact 34 of cam-microswitch 30 (which is out of detent at 90°) thereby energizing relay 68 which will remain energized by means of the circuit now formed by closed contact 18 of cam-microswitch 14, diode 44 and closed contact 74 of the said relay 68. This relay remains closed for the remainder of the cam switch 14 cycle. When relay 68 is energized, power is removed from wafer 144 of relay 138 by the opening of contact 78 and is applied to wafer 140 of relay 138 through closed contact 74 of relay 68 and contact 142 of relay 138. This causes relay 138 to continually advance until reset. The third and fourth pulses of the fire signal will each advance relay 124 one step. On the fourth step, the fire signal is complete and a fire signal is placed on the output line from wafer 130 of relay 124 through contact 132. Further, on the fourth step relay 88 is energized by a pulse through diode 118. This causes relay 124 to be reset by means of the application to said relay of a constant voltage through now closed contact 20 of cam switch 14, closed contact 106 of relay 88, diode 108, diode 112 and contact 128 through wafer 126 of relay 124. With both relays 124 and 138 reset, the wafers 134 and 148 make contact with contacts 136 and 150 respectively, thereby shorting relay 88 and causing its contacts to open. Resistor 116 allows the current generated by the collapsing inductive field about the coil of relay 88 to be safely bled off.

The operation for an incoming safe signal is similarly accomplished, utilizing cam switch 30 and relay 138 as the central switches. Upon completion of the four safing pulses, the output signal appears on contact 146 of wafer 144 in relay 138.

It is readily seen that any incoming signal that is not the exact width and spacing of a fire or safe signal will cause both relays 124 and 138 to advance to reset position, thus preventing a false safe or fire signal output.

It is understood that the switching devices described above could be easily substituted with equivalent structure, either mechanical or electrical, and the present invention is not intended to be limited to the particular embodiment described above.

We claim:
1. In a signal differentiating device, the improvement comprising:
   a first cam operated switch, a second cam operated switch, a first cam disk and a second cam disk arranged to operate said first and said second switches respectively, at least one of said cam disks having a plurality of cams of varied lengths and spacing, a first multiposition stepping relay and a second multiposition stepping relay, and connecting means whereby both of said stepping relays are reset when a signal is applied to said switches which does not exactly match the operating sequence of one of said switches.

2. The apparatus of claim 1 and including connecting means whereby one of said stepping relays is advanced to a signal output position and the other of said stepping relays is reset when a signal exactly matching the operating sequence of one of said switches is applied to said switches.

3. The apparatus of claim 2 wherein said connecting means include a plurality of switching relays, and means whereby one of said switching relays is operated by any part of a signal which does not exactly match the operating sequence of one of said cam operated switches.

4. The apparatus of claim 3 and including a resetting relay, said resetting relay being adapted to receive a reset signal when one of said multiposition stepping relays is moved to a signal output position and to thereby cause said multiposition stepping relay to advance to a reset position.

5. The apparatus of claim 4 and including a cycling means whereby said apparatus is caused to progress through one complete cycle when a signal is applied to said cam operated switches.

6. The apparatus of claim 5 wherein each of said multiposition stepping relays comprise a plurality of wafers including a wafer for releasing said resetting relay and a wafer for forwarding an output signal when a multiposition stepping relay has stepped to a signal output position.

References Cited

UNITED STATES PATENTS 3,058,095  10/1962  Reynolds.
3,058,104  10/1962  Garfinkel et al. ____ 340—164 X JOHN W. CALDWELL, *Primary Examiner.*

H. I. PITTS, *Assistant Examiner.*

U.S. Cl. X.R.

317—134; 340—167